United States Patent Office 3,360,935
Patented Jan. 2, 1968

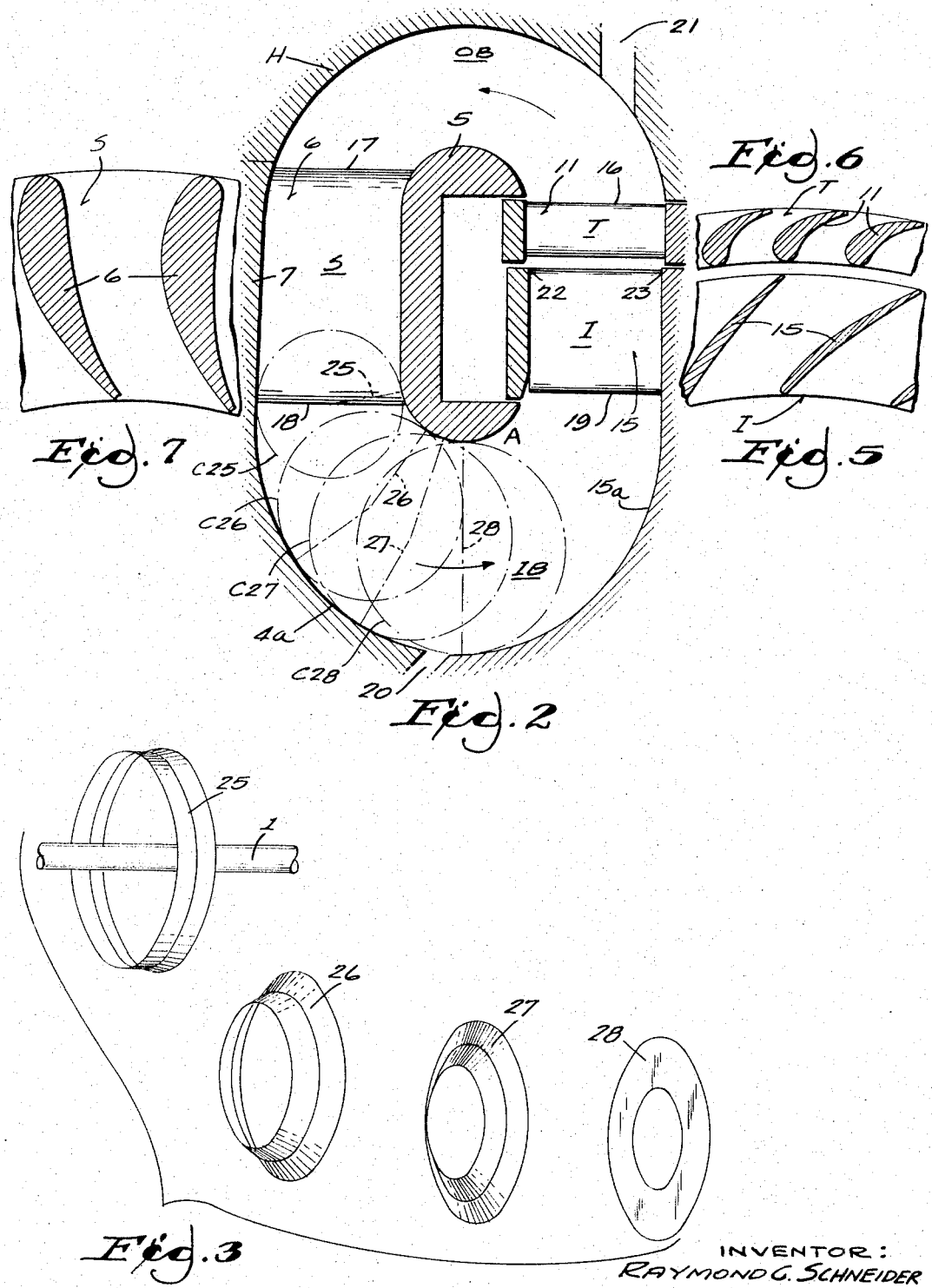

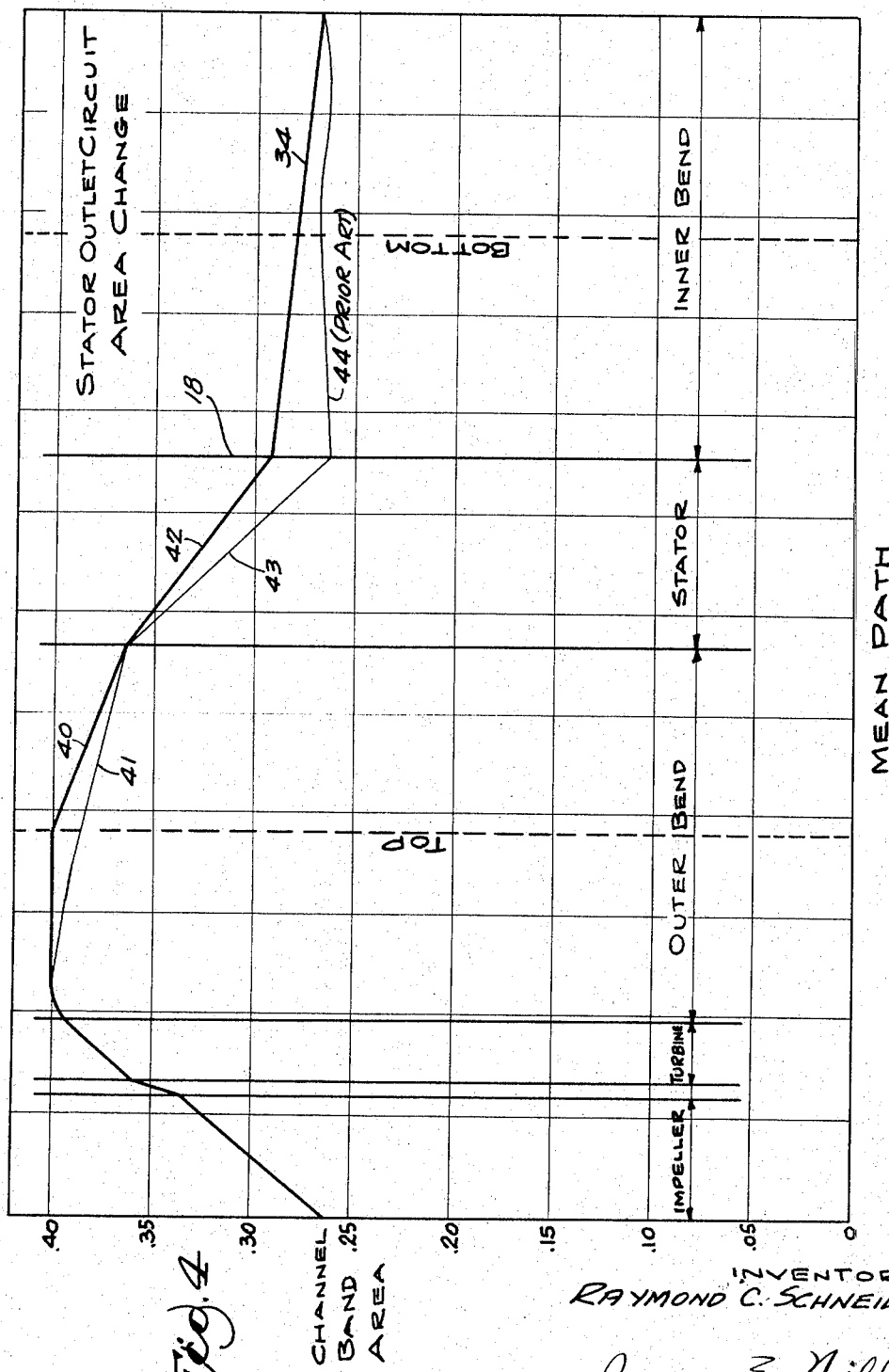

3,360,935
HYDRAULIC TORQUE CONVERTER
Raymond C. Schneider, Rockford, Ill., assignor to Twin Disc, Incorporated, Racine, Wis., a corporation of Wisconsin
Filed Mar. 18, 1966, Ser. No. 535,417
5 Claims. (Cl. 60—54)

ABSTRACT OF THE DISCLOSURE

A torque converter having an impeller, a turbine and a stator in a closed toroidal circuit having specific shape and dimensioning of the parts for optimum performance, including an inner bend section between the stator and impeller, the cross sectional area of which inner section continually and gently decreases, thereby preventing fluid breakaway and improving performance. The converter also has a stator cross sectional area which is limited in the amount it decreases in area, whereby the continually decreasing inner bend can be utilized.

---

The present invention relates to a three element hydraulic torque converter of the type comprising an impeller, a turbine and a stator, each having a ring of blades. These three elements, together with outer and inner bend sections, form a closed toroidal circuit for the fluid.

A general object of the present invention is to provide a hydraulic torque converter of the above type in which the relative shape and dimensioning of the parts is such as to provide optimum performance and a unit which can absorb more horsepower than others of comparable size.

Converters of this type include a turbine and impeller member at one side of the toroidal circuit and a stator at the other side, the two sides being connected by an outer bend section and by an inner bend section. Various shapes and dimensions of these parts have been proposed in the past in an effort to obtain high efficiency and optimum performance characteristics.

The present invention provides a converter of the above type wherein the inner bend section continuously converges, that is to say, it is formed with a channel band area which continuously and gently decreases from the stator outlet to the impeller inlet. This area reduction is preferably about 9 per cent.

A more specific object of the invention is to provide a converter having such a continuously converging inner bend section in respect to its channel area, together with a stator which is tapered or which decreases in cross sectional area from its inlet to its outlet ends. This change in stator area can be effected either by making the side of the stator as a straight line or of other shapes. The maximum stator area contraction is preferably limited to about 20–21 percent.

The invention also contemplates inner bend and stator members having the above mentioned particular shapes, together with an outer bend section which converges in channel band area from its beginning (outlet side of the turbine) and to its end at the inlet end of the stator. This contraction of the outer bend may be continuous from its beginning to its end and this shape has proved very desirable. However, this outer bend section can also have its first portion of uniform channel area and its latter portion then of a contracting area. In either event the optimum amount of contraction of the outer bend section channel area from the inlet side to its outlet side is preferably about 7 to 8 percent.

Still another more limited aspect of the invention relates to a converter having the above shapes and also having an impeller outlet width which is about 10–12 percent of the outside diameter of the impeller as measured from the center line of the converter.

The present invention made in accordance with the above characteristics has proven to be particularly efficient and capable of absorpting increased horsepower over and above that of conventional designs.

These and other objects and advantages of the present invention will appear as this disclosure progresses, reference being had to the accompanying drawings, in which:

FIGURE 2 is an enlarged, cross sectional view of the upper portion only of the converter shown in FIGURE 1;

FIGURE 3 is a schematic, perspective view of several channel bands through the inner bend section of the torque converter as shown in the drawings;

FIGURE 4 is a graph showing the area changes of the channel band through the flow path in the converter;

FIGURES 5, 6 and 7 are cross sectional views, respectively, of the impeller, turbine and stator blades.

Figure 1:
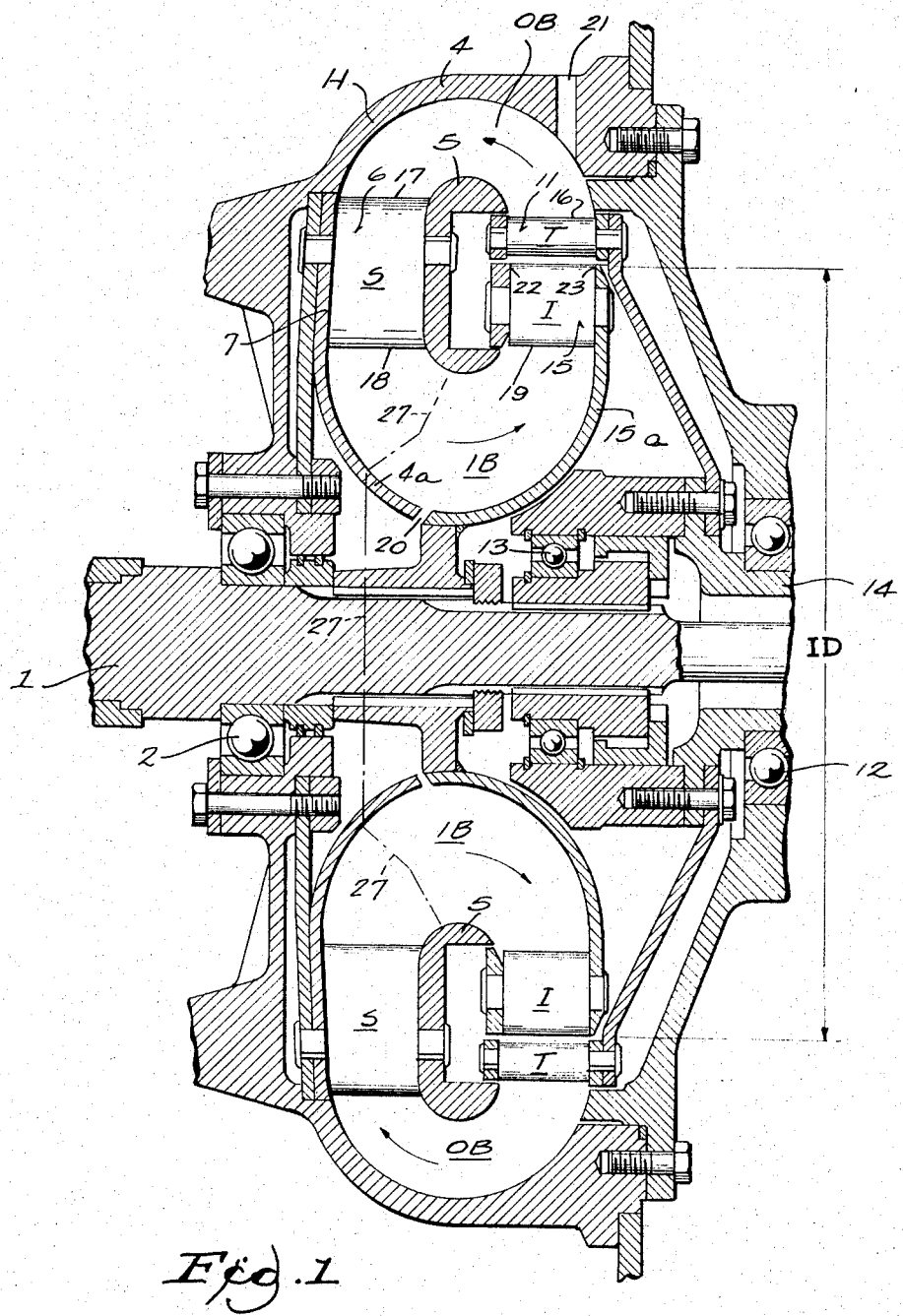
FIGURE 1 is a longitudinal, cross sectional view through a torque converter embodying the present invention.

Referring in greater detail to FIGURE 1 of the drawings, a power shaft 1 is mounted on an anti-friction bearing assembly 2 in a stationary housing H which includes an outer wall 4 and an inner core ring or wall 5. A stationary stator S is fixed to the housing H and has a series of stator blades 6 fixed between the outer wall 7 and inner wall 5.

The torque converter also includes a turbine member T having a series of conventional blades 11 and is mounted for rotation on the antifriction bearings 12 and 13 to drive the output shaft 14.

The impeller I also has a series of blades 15 through which the fluid passes in the known manner as it flows through the toroidal path in the direction indicated by the arrows. The impeller is driven by shaft 1 through the wall member 15a splined to the shaft.

The flow circuit is also defined by an outer bend section OB formed in and by the housing H, and the inner core ring 5 and which outer bend section connects the outlet side 16 of the turbine to the inlet side 17 of the stator.

The outlet side 18 of the stator is connected to the inlet side 19 of the impeller I by means of the inner bend section IB. This inner bend section is defined by the inner core ring 5, the wall 15a and a wall portion 4a of the housing.

The outer and inner bend sections may be provided with blades, but are shown here as being bladeless.

The direction of flow in the toroidal path is indicated by the arrows, the coolant fluid entering the path at the inlet 20 and eventually discharging from the path at 21.

Thus the torque converter comprises a rotating impeller and turbine, and the stationary stator, and an outer bend section connects the turbine to the stator while the inner bend section connects the discharge of the stator to the inlet side of the impeller.

In describing the present invention, reference will be made to the channel band area. Certain channel bands 25, 26, 27 and 28 are shown constructed in FIGURE 2 and similar bands could be constructed throughout the toroidal flow path. These bands 25, 26, 27 and 28 which are actually two straight lines, end to end, in many cases, are formed by two radii from the center of a circle, C25, C26, C27 and C28 inscribed in the plane of the torus, as shown in FIGURE 2. In other words, a circle inscribed in the path becomes tangent to the inner and outer walls at points which do not necessarily form a straight line with the center of such a circle. The center of the circles are located on the median flow of the path of the oil. These bands represent the area of the channel through which all of the oil passes in its travel around the circuit. The channel band area of any portion of the toroidal path is defined as the area of the ring-like band extending entirely around the torque converter and through that portion. As shown in FIGURE 3, several of these channel bands 25, 26, 27 and 28 have been indicated, and it is the area of these bands which will be referred to herein as the channel area of the various elements. Generally speaking, for a given width of the toroidal path as shown in a cross sectional view such as FIGURE 2, the area of a channel band through that width will be greater the farther it is removed from the center line of the torque converter.

INNER BEND SECTION

In accordance with the present invention I have found a marked increase in desirable performance characteristics by making the inner bend section so that its channel band area from the discharge side 18 of the stator to the inlet side 19 of the impeller, continuously and smoothly decreases at a set rate. In other words, the inner bend section should be made to continuously converge, in respect to its channel area, from the outlet of the stator to the inlet of the impeller.

As shown in FIGURE 4 the smoothly decreasing channel area of the inner bend section is shown by the line 34 and it will be seen that the channel area thus diminishes gradually and smoothly throughout the length of the inner bend section, in the direction of fluid flow.

By so designing the inner bend section, I have found that cavitation and turbulence is considerably reduced in the location A shown in FIGURE 2, and as the fluid passes location A, it hugs both sides of the inner bend section and results in a considerable increase in efficiency. Because of the increase in area of the stator outlet 18 to implement this converging channel, the converter has the ability to absorb more horsepower and a marked increase in converter characteristics has been provided by the improved inner bend section of the present invention.

STATOR

The stator S is designed with a channel band area which reduces a maximum about 21% from the inlet side 17 of the stator to its outlet side 18. As shown in FIGURE 2, the outer wall 7 of the stator is inclined or tapers as a straight line to provide this difference in cross sectional area of the stator channel band. However, other forms or shapes of the wall of the stator may be employed to provide this reduction of stator channel band area from its inlet 17 to its outlet 18. I have found that the combination of the stator which has a reduction in its channel band area from its beginning to its end, together with the improved inner bend section above referred to is of particularly efficient design.

OUTER BEND SECTION

Also in accordance with a more specific aspect of the present invention, the improved stator and inner bend section are furthermore particularly efficient if an outer bend section is provided which reduces in its channel area from its beginning 16 to its end 17 in the amount of about 7 or 8 percent. This reduction in channel area of the outer bend section can be a continuous one from its beginning to its end, or alternatively, the outer bend section reduction can occur during its latter portion while the first portion, adjacent the turbine, remains of constant area for a distance. Thus the outer bend section is formed as a smoothly converging flow path, preferably being of continuous and gradual contraction throughout its length.

IMPELLER

Another aspect of the invention relates to the critical dimensions of the impeller with its discharge side, in respect to the diameter of the impeller as indicated by the reference line ID in FIGURE 1. In other words, the width of the impeller from point 22 to point 23 bears a critical relationship, when used with the other elements of this invention, with the diameter ID of the impeller. More specifically, the width of the impeller at its outlet should be about 10 to 12 percent of the diameter ID of the impeller, as the latter is measured across the entire torque converter.

GENERAL

The arcuate length of the inner bend section IB may be greater or less than that shown in the drawing, as can the arcuate lengths of the other members.

Referring to the graph shown in FIGURE 4, the curves 40 and 41 of the outer bend section OB illustrate the alternate channel area constructions made in accordance with the present invention.

Curve 42, a plot of channel band area in the stator shows the construction where the side 7 of the stator has been flared out or tapered to give less of a reduction in channel band area than the prior art construction as exemplified by line 43.

The inner bend section IB of the graph of FIGURE 4 shows the curve 44 of the channel band area of an example of the prior art. Curve 34 is a plot of the channel band area of an inner bend section made in accordance with the present invention, and illustrates the continually reducing area at a set rate.

Various modes of carrying out the invention are contemplated as being within the scope of the following claims particularly pointing out and distinctly claiming the subject matter which is regarded as the invention.

I claim:

1. In a hydraulic torque converter of the type having a bladed turbine, a bladed impeller and a bladed stator, an outer bend section between said turbine and stator, and an inner bend section between the outlet of said stator and the inlet of said impeller, all of which together form a closed toroidal circuit through which fluid is circulated, the improvement comprising, said inner bend section being of a channel band area which continually converges throughout the length of said section in the direction of fluid flow, said stator having a channel band area which reduces a maximum of about 21 percent from the inlet of the stator to the outlet of the stator.

2. The converter set forth in claim 1 further characterized in that said inner bend section reduction is approximately 9 percent.

3. The converter set forth in claim 2 further characterized in that the outer bend section reduces in channel band area approximately 8 percent from its inlet to its outlet.

4. The converter set forth in claim 3 further characterized in that the impeller outlet width is in the approximate range of 10 to 12 percent of the outside diameter of the impeller.

5. In a hydraulic torque converter of the type having a bladed turbine, a bladed impeller and a bladed stator, an outer bend section between said turbine and stator, and an inner bend section between the outlet of said stator and the inlet of said impeller, all of which together form a closed toroidal circuit through which fluid is circulated, the improvement comprising, said inner bend section being of a channel band area which continually converges throughout the length of said section in the direction of fluid flow, the inlet of said stator being of a length in an axial direction which is less than the axial length of said stator outlet.

References Cited

UNITED STATES PATENTS

| | | | |
|---|---|---|---|
| 3,016,709 | 1/1962 | Lysholm | 60—54 |
| 3,071,928 | 1/1963 | Dundorf et al. | 60—54 |
| 3,125,857 | 3/1964 | Schneider | 60—54 |
| 3,320,747 | 5/1967 | Denes | 60—54 |
| 3,150,492 | 9/1964 | Gsching | 60—54 |
| 3,192,719 | 8/1965 | Kronogard | 60—54 |

FOREIGN PATENTS 875,168  8/1961  Great Britain.

EDGAR W. GEOGHEGAN, *Primary Examiner.*